United States Patent
Batlle et al.

(10) Patent No.: US 11,354,318 B2
(45) Date of Patent: Jun. 7, 2022

(54) REAL-TIME COLLECTION AND DISTRIBUTION OF EVENT STREAM DATA

(71) Applicant: Target Brands, Inc., Minneapolis, MN (US)

(72) Inventors: Jordi Batlle, Minneapolis, MN (US); Dan Damkoehler, Minneapolis, MN (US); Clive Dsouza, Minneapolis, MN (US); Amanda Engelman, Minneapolis, MN (US); Edward Grams, Minneapolis, MN (US); Don Nguyen, Minneapolis, MN (US); Davis Nyabuti, Minneapolis, MN (US); Melissa Sanders, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/533,430

(22) Filed: Aug. 6, 2019

(65) Prior Publication Data

US 2021/0042314 A1 Feb. 11, 2021

(51) Int. Cl.
*G06F 16/00* (2019.01)
*G06F 16/2455* (2019.01)
*G06F 16/21* (2019.01)
*G06F 16/22* (2019.01)
*G06F 16/25* (2019.01)

(52) U.S. Cl.
CPC ...... *G06F 16/24568* (2019.01); *G06F 16/212* (2019.01); *G06F 16/22* (2019.01); *G06F 16/258* (2019.01)

(58) Field of Classification Search
None
See application file for complete search history.

(56) References Cited

U.S. PATENT DOCUMENTS 6,662,206 B1 * 12/2003 Banavar ............. H04L 12/1895
709/201
8,429,243 B1 4/2013 Wang et al.
(Continued)

OTHER PUBLICATIONS

Segment, "Segment's Customer Data Infrastructure (CDI) has three components" (https://segment.com), Dated: Nov. 2, 2018; 6 Pages.
(Continued)

*Primary Examiner* — Farhan M Syed
(74) *Attorney, Agent, or Firm* — Merchant & Gould P.C.

(57) ABSTRACT

As a user navigates a website and/or mobile application, events may be captured. Example events include user interactions, return of information from services, and recommendation calls. Event stream data associated with the event may be collected once and provided to a server platform via a streaming data service. The event stream data may be converted to an appropriate structure for storage at the server platform by applying a schema. The schema applied may take advantage of a format in which the event stream data is captured at the client application. This enables the client application to provide minimal data to the server platform (e.g., an incomplete record) and the server platform to complete the record according to the schema. The event stream data may be saved internally within a database of the server platform, and distributed to one or more third parties in a compatible format.

21 Claims, 9 Drawing Sheets

(56) References Cited

U.S. PATENT DOCUMENTS

| | | | |
|---|---|---|---|
| 9,454,526 B1* | 9/2016 | Kapoor | G06F 21/00 |
| 9,813,467 B1* | 11/2017 | Barrett | G06F 16/00 |
| 9,836,501 B2* | 12/2017 | Robichaud | G06F 17/30634 |
| 9,921,732 B2* | 3/2018 | Noel | G06F 16/00 |
| 10,061,824 B2* | 8/2018 | Robichaud | G06F 16/3334 |
| 10,127,120 B2* | 11/2018 | Park | G06F 11/1471 |
| 10,185,708 B2* | 1/2019 | Miller | G06F 17/30572 |
| 10,203,842 B2* | 2/2019 | Miller | G06F 16/2372 |
| 10,204,093 B2* | 2/2019 | Miller | G06F 16/2372 |
| 10,204,132 B2* | 2/2019 | Miller | G06F 17/30365 |
| 10,235,418 B2* | 3/2019 | James | G06F 16/2455 |
| 10,255,141 B2* | 4/2019 | Park | G06F 11/1471 |
| 10,509,555 B2* | 12/2019 | Noel | G06F 16/00 |
| 10,936,585 B1* | 3/2021 | Echeverria | G05B 13/00 |
| 2002/0103664 A1 | 8/2002 | Olsson et al. | |
| 2004/0006741 A1* | 1/2004 | Radja | G06F 40/143 715/236 |
| 2004/0122943 A1* | 6/2004 | Error | H04L 29/06 709/224 |
| 2006/0130070 A1* | 6/2006 | Graf | H04L 41/0631 719/318 |
| 2013/0136253 A1* | 5/2013 | Liberman Ben-Ami | H04M 3/5191 379/265.09 |
| 2015/0040052 A1* | 2/2015 | Noel | G06F 3/04847 715/771 |
| 2016/0219089 A1* | 7/2016 | Murthy | H04L 65/4076 |
| 2016/0224532 A1* | 8/2016 | Miller | G06F 17/30572 |
| 2016/0224613 A1* | 8/2016 | Miller | G06F 16/2372 |
| 2016/0224618 A1* | 8/2016 | Robichaud | G06F 16/235 |
| 2016/0224631 A1* | 8/2016 | James | G06F 16/235 |
| 2016/0224642 A1* | 8/2016 | Miller | G06T 11/206 |
| 2016/0224676 A1* | 8/2016 | Miller | G06F 16/24544 |
| 2016/0225271 A1* | 8/2016 | Robichaud | G06F 3/0484 |
| 2016/0241577 A1* | 8/2016 | Johnson | G06F 16/24554 |
| 2017/0116089 A1* | 4/2017 | Park | G06F 16/2433 |
| 2017/0116210 A1* | 4/2017 | Park | G06F 9/542 |
| 2018/0060398 A1 | 3/2018 | Johnson et al. | |
| 2018/0075163 A1* | 3/2018 | Park | G06F 8/35 |
| 2018/0121497 A1* | 5/2018 | Robichaud | G06F 16/33 |
| 2018/0157404 A1* | 6/2018 | Noel | G06F 3/04847 |
| 2019/0012304 A1* | 1/2019 | Robichaud | G06F 16/23 |
| 2019/0069028 A1* | 2/2019 | Deshpande | H04N 21/235 |
| 2019/0171633 A1* | 6/2019 | Demla | G06F 16/2358 |
| 2019/0361916 A1* | 11/2019 | Weaver | G06F 21/6227 |
| 2020/0057554 A1* | 2/2020 | Noel | G06Q 10/063 |

OTHER PUBLICATIONS

MParticle, "The customer data platform for the connected age" (https://www.mparticle.com/platform/native-data-collection), Dated: Nov. 2, 2018; 3 Pages.

* cited by examiner

REAL-TIME COLLECTION AND DISTRIBUTION OF EVENT STREAM DATA

BACKGROUND

Web analytics provide valuable insights to many businesses, including retailers, advertisers, and marketers, by informing how users are interacting with various user interfaces, such as websites and mobile applications. In the electronic commerce industry, it is common for an online retailer, for example, to allow a third party to obtain clickstream data from their associated website to identify user interactions, such as page loads and clicks. To do so, the third party provides a snippet of code (e.g., a pixel) to be placed on the online retailer's website. When users land on the website, the snippet of code externally calls an endpoint of the third party to request additional code for execution on a page of the website to collect clickstream data that is sent back to the third party.

However, because the third party is providing the code, the online retailer has limited control over what types of data are being collected from their website, or who the third party may ultimately send the data to. Additionally, the subsequent external call process may create an opportunity for malicious attacks on the online retailer and/or the third party. Moreover, the online retailer may interact with multiple third parties who each provide code for placement on the website. As the amount of code increases and the number of external calls that have to be made when a user lands on the website increases, latency is added and a speed at which a user may navigate the website decreases. Many of these third parties are often collecting the same data, resulting in an unnecessary replication of data collection, further contributing to the latency.

It is with respect to these and other general considerations that embodiments have been described.

SUMMARY

In accordance with the present disclosure, the above and other issues are addressed by the following:

In a first aspect, methods for collecting event stream data in real-time are disclosed. An example method includes receiving event stream data associated with an event through a streaming data service in response to the event being captured at a client application. The event stream data may include a metadata record comprised of a plurality of data fields, and the metadata record may be incomplete. The example method may also include converting the event stream data to a storage format by applying a schema. The schema may be based on a position of each data field of the plurality of data fields in the metadata record, where the position defines information contained within each data field. The example method may further include completing the metadata record according to the schema, and saving the converted event stream data including the completed metadata record in a database.

In a second aspect, systems for collecting event stream data in real-time are disclosed. An example server platform includes a communication interface receiving data from a client application, a processor communicatively connected to the communication interface, and a memory communicatively connected to the processor and communication interface. The memory stores instructions, which when executed by the processor, cause the server platform to receive event stream data associated with the event through a streaming data service in response to an event being captured at the client application. The event stream data may include a metadata record comprised of a plurality of data fields, and the metadata record may be incomplete. The event stream data may be converted to a storage format by applying a schema, where the schema may be based on a position of each data field of the plurality of data fields in the metadata record, the position defining information contained within each data field. The metadata record may be completed according to the schema, and the converted event stream data including the completed metadata record may be saved in a database.

In a third aspect, a non-transitory computer-readable medium with instructions stored thereon for real-time collection and distribution of event stream data is disclosed. Example instructions may include receiving event stream data associated with an event through a streaming data service in response to the event being captured at a client application. The event stream data may include a metadata record comprised of a plurality of data fields, and the metadata record may be incomplete. The example instructions may also include converting the event stream data to a storage format by applying a schema. The schema may be based on a position of each data field of the plurality of data fields in the metadata record, where the position defines information contained within each data field. The example instructions may further include completing the metadata record according to the schema, saving the converted event stream data including the completed metadata record in a database, and distributing at least a portion of the event stream data to one or more third parties.

BRIEF DESCRIPTION OF THE DRAWINGS

Non-limiting and non-exhaustive examples are described with reference to the following figures.

DETAILED DESCRIPTION

Figure 1:
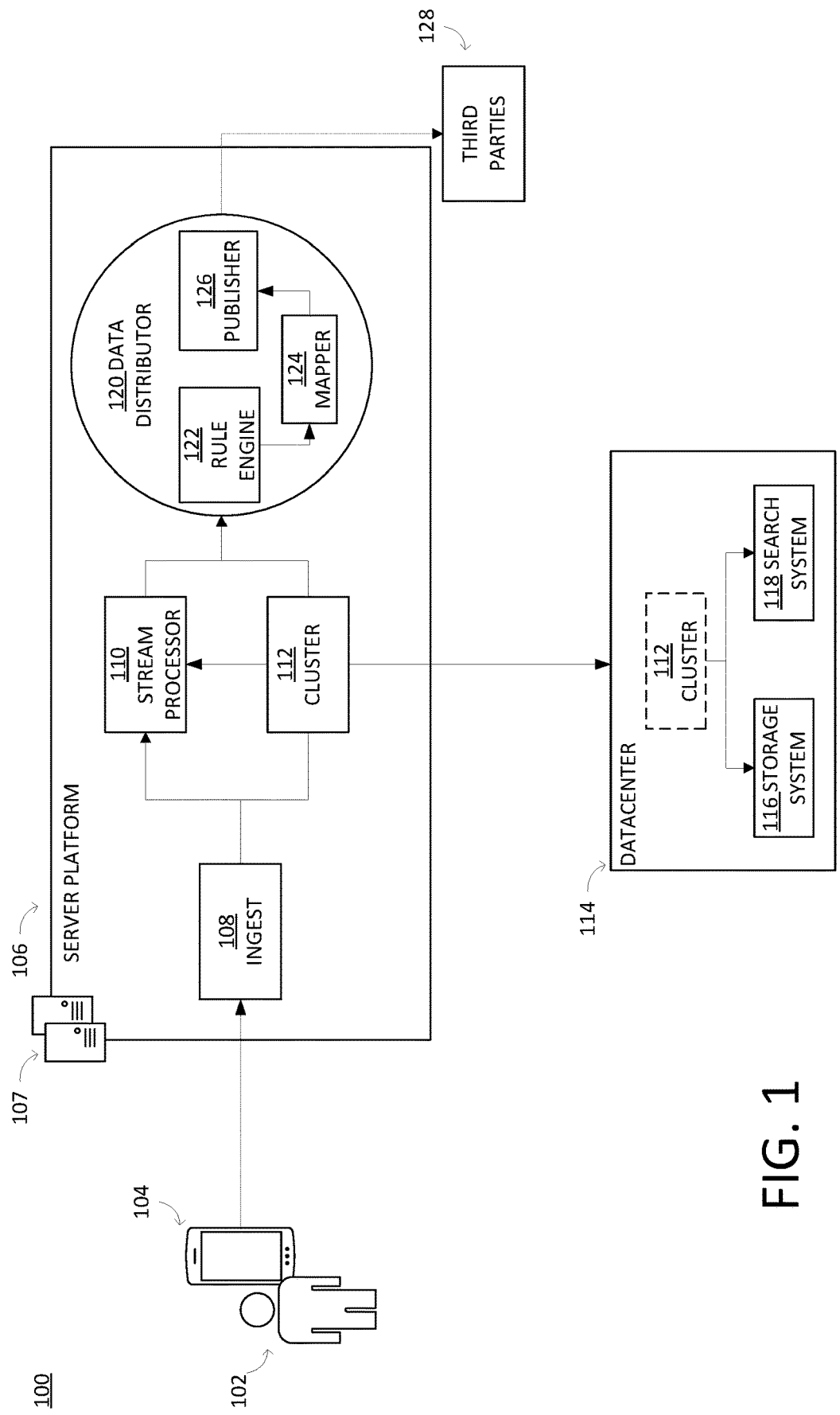
FIG. 1 illustrates an example network environment where a system for real-time collection and distribution of event stream data may be implemented.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present invention are directed to the real-time collection and distribution of event stream data to third parties. In an example embodiment, an event may be detected at a client application executing on a consumer device. The event may be a user interaction, such as a page load or a click, a return of information by a service, a recommendation call, or a display of an advertisement, among other examples. Event stream data associated with the event may be collected and provided to a server platform via a streaming data service. The server platform may perform a data serialization to convert the event stream data to an appropriate structure for storage at the server platform, which involves application of a schema. The schema applied may take advantage of the format in which the event stream data is captured at the client application. For example, when the event is captured, the event is tagged with associated metadata. The metadata may describe attributes of the data, such that the data may be captured in part or in whole, at a client, in an unstructured but labeled form. However, when a schema is applied according to aspects of the present disclosure, that schema may include a position of each data field defines information contained within the data field. Correspondingly, the storage format comprises a database table where the rows represent an event and the columns represent each of the plurality of data fields in the metadata. This enables the client application to provide minimal data to the server platform (e.g., an incomplete metadata record) and the server platform to complete the record according to the schema. The event stream data may be saved internally within a database of the server platform, and distributed to one or more third parties in a format compatible with the respective third party.

Disclosed embodiments enable the event stream data to be collected once, saved internally, and then distributed to one or more third parties in real-time. By the server platform applying a schema that takes advantage of the format in which the event stream data is captured at the client application, the amount of data transmitted between the client application and the server platform is reduced, which reduces bandwidth, and the data serialization is maintained on the server platform, which prevents bogging down the client application and the device on which the client application is executing with heavy processing requirements.

Additionally, the need for third party code insertion into the client application to collect data associated with each event to send back to the third party is eliminated, which has several advantages. By removing third party code from the client application, less code is being executed by the client application and fewer external calls are being made, which reduces latency and thus helps improve a speed at which a consumer may navigate through the client application. Also, data collection for an event is no longer replicated for each third party that is interested in collecting data associated with that particular type of event. Instead, the data for each event is collected once and then distributed to the one or more interested third parties, further reducing latency and improving speed at the client application. This in turn benefits the device on which the client application is running, for example by conserving battery. Further, an entity controlling the platform may more easily control to whom, where, and when the data is sent and may quickly stop the flow of data to a particular third party if necessary, increasing governance. Yet further, because inserting third party code into the client application and the subsequent external call process may create an opportunity for malicious attacks, removing such code increases security. Also, by saving a copy of the data that is transmitted to the third party, a distribution log may be created indicating which third party received data and what data they received. In light of growing concerns about data privacy, this feature may allow compliance with required laws and/or implemented policies.

Moreover, the types of event stream data collected are more comprehensive than clickstream data, which is traditionally collected for web analytics and is limited to data associated with user interactions. The more comprehensive data collection provides greater context about consumer experiences when interacting with the client application. Additionally, because the event stream data is collected and distributed in real-time, same-session personalization based on the current consumer rather than personalization based on users like the current user may be available. The increased comprehensiveness of event stream data is enabled at least in part due to increased efficiency with which such event stream data is captured, provided to a server device, and serialized for subsequent analysis, as discussed in connection with various embodiments described herein.

FIG. 1 illustrates an example network environment where a system for real-time collection and distribution of event stream data may be implemented. As shown in a diagram 100, a user 102 may interact with a client application executing on a device 104. The device 104 may include a smartphone, a tablet, a laptop, a desktop computer, or a computer-wearable device, among other examples. A thin version of the application (e.g., a web application accessed by the user 102 via a web browser) or a thick version of the application (e.g., a locally installed application) may be executed. A software development kits (SDK) may be used to create and maintain the client application, where different SDKs are used for the different versions of the client application. A web application may be created using a web SDK, and locally installed versions of the application may be created using an SDK specific for a platform on which the device 104 is operating. For example, an IOS SDK or an Android SDK may be used if the device 104 is operating on an IOS or Android platform, respectively. The client application may be associated with an entity, such as an online retailer. In one example, the online retailer may enable consumers to view, search for, and purchase products through the client application.

As the user 102 navigates and interacts with the client application, events may be captured and data associated with each event may be provided for ingest to a cloud-based server platform 106. Example events may include user interactions with the client application, such as a page load or a click, as well as other types of events not dependent on a user interaction, such as recommendation calls, display of an advertisement in a viewing screen, and collection of information from services (e.g., return of information by a service). Data associated with the event may be captured at a time the event occurs.

In some embodiments, the server platform 106 may be hosted by a same entity with which the client application is associated, such as the online retailer. The server platform 106 may include several components, including an ingest component 108, a stream processor component 110, and a data distributor component 120. The server platform 106 and the components thereof may be executed by one or more processors 107.

The ingest component 108 may receive the data associated with each event, referred to hereinafter as event stream data. The ingest component 108 may be a streaming data service, such as a Kafka streaming data service provided by the Apache Software Foundation. The streaming data service may, among other things, permit the client application to publish streams of data to topics (e.g., categories) that are subscribed to by zero to many data consumers. For example, the streaming data service may receive and process the event stream data published from the client application as messages that are transferred onto the topics within a cluster 112 for storage. One message may represent the event stream data associated with one event.

A replica of the cluster 112 may be provided to a datacenter 114 of the entity associated with the server platform 106. The datacenter 114 may include a storage system 116 that stores various types of data collected by and/or produced by the entity. The serialized event stream data (i.e., the messages) within the replica of the cluster 112 may be provided to the storage system 116 for storage. Additionally, the datacenter 114 may include a search system 118 that enables the entity to effectively search for data within the storage system 116.

When the events are captured at the client application, each event may be tagged with, or represented by, metadata. For example, for a "click" event type, metadata associated with the click may indicate a product associated with the click, a time of the click, a duration of the click, and whether the click was associated with a purchase, among other metadata.

In some embodiments, the ingest component 108 can perform a number of operations on ingested data, such as serialization of data. By serializing the data, each data element may not be required to be stored with a metadata tag, but would instead be structured so that a position of data within a string, array, or other data structure represents the meaning of that data. Metadata-tagged data may be serialized by placing data into such a structure and zero-filling unpopulated fields (e.g., fields for which no metadata-tagged data exists).

Through the data serialization process, the event stream data and the associated tagged metadata may be converted into a format required by the server platform 106 for database storage and/or sharing, where the format allows reconstruction of the data into its original structure. The data serialization process may utilize Apache Avro™ provided by the Apache Software Foundation, and the format may be defined using JSON.

There are several methods in which data serialization may be performed. In one method, data serialization may be performed by the client application executing on the device 104. For example, the client application may convert the event stream data and associated tagged metadata into the format required by the server platform 106, and provide the converted data to the server platform 106. This has the advantage of formatting the data for direct ingestion by third party services that can use that data for a variety of purposes, such as user behavior analysis and advertisement placement. However, this pre-communication serialization requires a significant amount of processing to be performed at a client device, which adds latency to the client application and the device 104 executing the client application, resulting in a slower browsing experience. Additionally, since the data is fully serialized, there may be a significant increase in the data being transmitted due to structuring the data according to a schema, a bandwidth between the client application and the server platform 106 may significantly increase.

Accordingly, in example embodiments as described herein, serialization is performed at the server platform 106, e.g., after data is ingested at the server platform 106. In such instances, because ingested data may not yet be serialized at the time of transmission to the server platform, it may be transmitted in a comparatively compact form, since it is not structured according to a destination schema which may require data fields that are null or unnecessary for many types of browser events, and is not transmitted alongside a schema definition.

By way of comparison, and continuing the example provided above for the "click" event type, the schema used for serialization may indicate a first data field represents the product, a second data field represents the time, a third data field represents the duration, a fourth data field represents a purchase, and so on. Based on the schema definitions, an expectation is created that a value present in a particularly positioned data field of metadata is indicative of the information that the particularly positioned data field represents. For example, a value in the first data field, such as "table", indicates a table was clicked on by the user. According to the desired schema (which may accommodate not just "click" event types but other event types), the data can be serialized, thereby generating a data structure that is adapted for analysis as noted above.

The above-described schema may specifically be applied to event stream data. However, the server platform may define a plurality of other different schemas for different types of data that may be collected at the client application. Other example schemas include an impressions schema for application to data associated with product impressions, an ad impressions schema for application to data associated with advertisements, a run analytics schema for application to data associated with service level errors and logging, and an in-line search feedback schema for application to data associated with search information, among others. There is a 1:1 relationship between a schema and an intended endpoint of the server platform 106. Therefore, various types of data may be collected at a same time and may be routed to a correct endpoint of the server platform 106 for conversion to a storage format by applying a respective schema.

In some embodiments, the schema may be evolved automatically and without breaking processes. Because web data is dynamic, and as new features and functionalities are added to the client application, the schema will adapt to such features. For example, a new data field may be added to the metadata. Traditionally, a multi-step process performed manually by a developer is required to evolve a schema. For example, the developer may be required to edit, deploy, and publish the schema. If new features or functionalities were introduced without defining structure or metadata around them, stream processes may start failing, which takes a lot of time and effort for the developer to stay on top of Embodiments described herein provide a user interface to enable automatic evolution of the schema. The user interface may prompt an administrator, for example, to enter inputs and provide an option to publish. The schema may be automatically evolved based on the inputs, and upon the administrator's selection of the option to publish, the newly evolved schema becomes available to the client application via the SDK through which the client application is created and maintained. Given the automation, administrators much less knowledgeable than a developer may be able to evolve the schema.

Because only the minimal amount of metadata necessary is provided by the client application for each event, values may not be generated for every data field within the schema at the client application. In other words, a metadata record that is "incomplete" relative to the schema to which an event is targeted is provided to the server platform 106. Continuing the example provided above for the "click" event type, the user may click on the table but the user may not purchase the table, and thus a data field representing the purchase is marked as null. As a result, when the stream processor component 110 converts the event stream data into the storage format (i.e., the database table previously described), several entries within a schema (e.g., cells within a row, once stored) may be empty. The stream processor component 110 may be configured to fill in these empty cells with appropriate default values according to the schema to complete the structure, once received at the server platform 106.

Additionally, once the data serialization process is performed to create structure, the stream processor component 110 may facilitate the writing of stream processes against the data. An example stream process may include personalization. Because the event stream data is being collected and serialized in real-time, same-session personalization based on the current user rather than personalization based on users like the current user may be available to provide recommendations through the client application.

In some embodiments, portions of the event stream data may be distributed to third parties 128. The data distributor component 120 of the server platform 106 may be comprised of a rule engine 122 operable to analyze event stream data for each event to determine, based on one or more rules, whether one or more portions of the event stream data for the respective event are to be distributed to one or more of the third parties 128. If portion(s) of the event stream data are determined to be distributed to a third party, a mapping component 124 may convert the portions of the event stream data into a format compatible with the third party using a template. The template may be defined by the third party and provided to the server platform 106. The template may also be specific to a particular type of event. A publishing component 126 may then publish the portion(s) of the event stream data in the compatible format to the third party. A copy of the data published to the third party may be saved internally, such as within the storage system 116. By saving copies of the data that is published to the third parties 128, a distribution log may be created indicating which third party received data and what data they received. In light of growing concerns about data privacy, this feature may allow compliance with required laws and/or implemented policies.

The data distributor component 120 may also support one or more microservices that allow users to create functions for deployment within the server platform 106 such that other interested users may utilize those functions. For example, a user may create a value unit, and the microservices may provide filters to allow the user to share the value unit that they have created and use value units created by others in the server platform 106. These features are described in greater detail below, in conjunction with FIG. 5.

Embodiments as described herein enable the event stream data to be collected once, saved internally, and then distributed to one or more third parties 128 in real-time. By the server platform 106 applying a schema that takes advantage of the format in which the event stream data is captured at the client application (rather than requiring the client application to format event stream data according to a particular schema), the amount of data transmitted between the client application and the server platform 106 is reduced, which reduces bandwidth. In addition, because data serialization is maintained on the server platform, that data serialization can be performed in a number of ways based on the intended target of that data. This has the effect of added flexibility, while preventing bogging down the client application and the device 104 on which the client application is executing with heavy processing requirements.

Additionally, the need for third party code insertion into the client application to collect data associated with each event to send back to the third party is eliminated, which has several advantages. By removing third party code from the client application, less code is being executed by the client application and fewer external calls are being made, which reduces latency and thus helps improve a speed at which a consumer may navigate through the client application. Also, data collection for an event, within the client application, is no longer replicated for each third party that is interested in collecting data associated with that particular type of event. Instead, the data for each event is collected once and then distributed to the one or more interested third parties from server platform 106, further reducing latency and improving speed at the client application. This in turn benefits the device 104 on which the client application is running, for example by conserving battery. Further, an entity controlling the server platform 106 may more easily control to whom, where, and when the data is sent and may quickly stop the flow of data to a particular third party if necessary, increasing governance.

Yet further, because inserting third party code into the client application and the subsequent external call process may create an opportunity for malicious attacks, removing such code increases security. Also, by saving a copy of the data that is transmitted to the third party, a distribution log may be created indicating which third party received data and what data they received. In light of growing concerns about data privacy, this feature may allow compliance with required laws and/or implemented policies.

Moreover, the methods and systems described herein provide not just improved performance and flexibility of use, the types of event stream data collected are more comprehensive than clickstream data, which is traditionally collected for web analytics and is limited to data associated with user interactions. The more comprehensive data collection provides greater context about consumer experiences when interacting with the client application (e.g., an amount of time spent on a particular page, or other events including but not limited to clickstream events). Additionally, because the event stream data is collected and distributed in real-time, same-session personalization based on the current consumer rather than personalization based on users like the current user may be available.

Figure 2A:
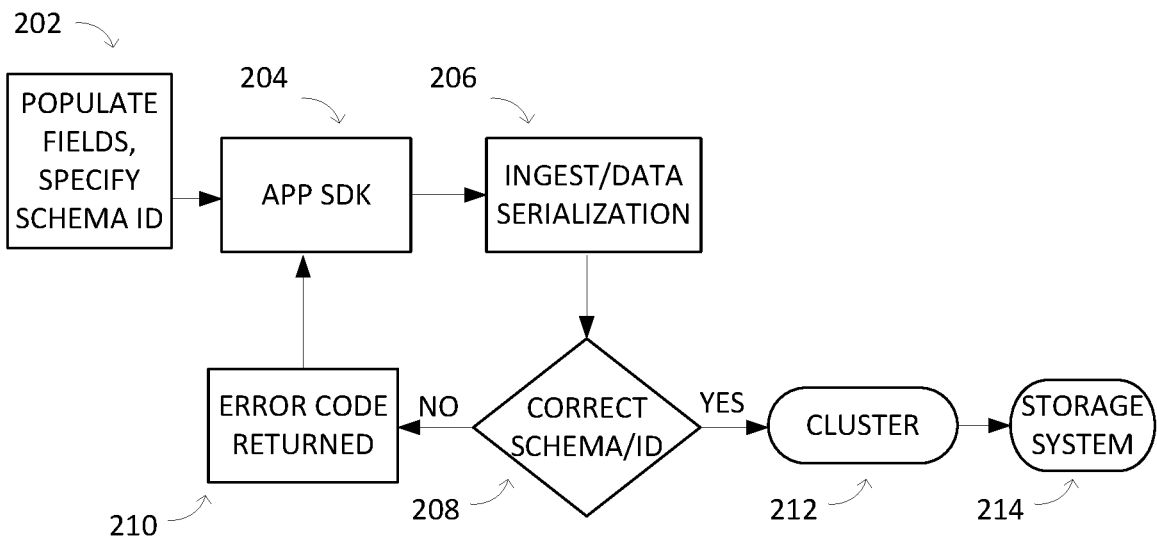
FIGS. 2A and 2B illustrate an example data serialization process.
Figure 2B:
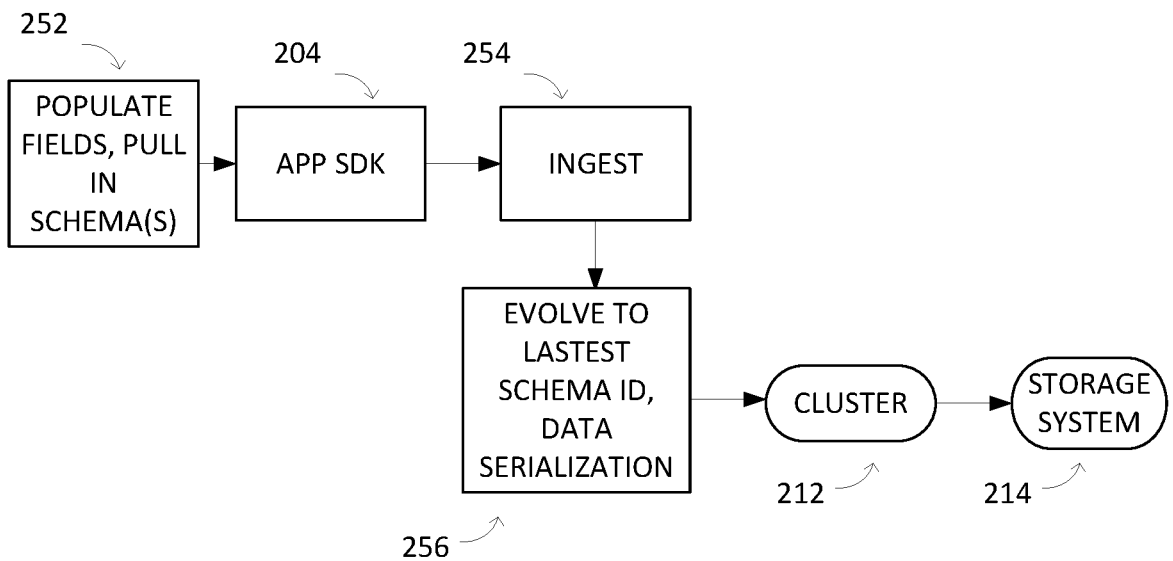

FIGS. 2A and 2B illustrate example data serialization processes. In the embodiment shown, a server platform is operable to collect data associated with an event captured at a client application, save the collected data internally, and optionally distribute portions of the collected data to one or more third parties in a compatible format. When an event is captured at the client application, the event can be tagged with metadata. The metadata can include a plurality of data fields (e.g., a metadata record). In some instances, the event stream data, including the associated tagged metadata, may be converted into a format required by the server platform for database storage and/or sharing through a data serialization process. Specifically, the server platform facilitates formatting and storage of the event stream data in a database that is structured according to a schema.

In some embodiments, as illustrated in diagram 200A of FIG. 2A, when an event occurs at the client application, at operation 202, the client application may populate data fields with values in the metadata record and specify a schema ID (e.g., a definition of collected data, including, for example, position of each data field in the metadata record and the information each positional data field represents). The record, along with the schema ID, may be provided to the server platform through the SDK 204 used to create and maintain the client application. At operation 206, a streaming data service may be utilized by the server platform to ingest the record, and the ingested record may be serialized by a stream processor into a format required by the server platform for storage by applying a schema based on the provided schema ID. At decision 208, the server platform may determine whether the schema/schema ID combination applied was correct (e.g., whether the event stream data could be processed by applying the schema associated with the schema ID). If incorrect, an error code may be returned to the SDK 204 at operation 210. If the correct, the ingested and serialized data may be stored within a cluster 212 of the streaming data service, which may then be replicated and provided for storage within a more comprehensive storage system 214.

In other embodiments, as shown in diagram 200B of FIG. 2B, when an event occurs at the client application, at operation 252, the client application may populate data fields with values in the metadata record, where a schema ID may not be specified. A schema may be specific to a type of data. For example, a web analytics schema may be associated with event stream data. Even though various types of data may be captured and collected at a same time, where each is associated with a different schema, because there is a 1:1 relationship between a schema and an endpoint to the server platform, the data may be routed to a correct endpoint of the server platform for conversion to a storage format by applying a respective schema. The SDK 204 used to create the client application provides the record to the server platform at the correct endpoint. At operation 254, a streaming data service may be utilized by the server platform to ingest the record. At operation 256, the record may be evolved to the latest schema ID for the respective schema and serialized into a format required by the server platform for storage. The serialized data may be stored within the cluster 212 of the streaming data service, which may then be replicated and provided for storage within the more comprehensive storage system 214.

Figure 3:
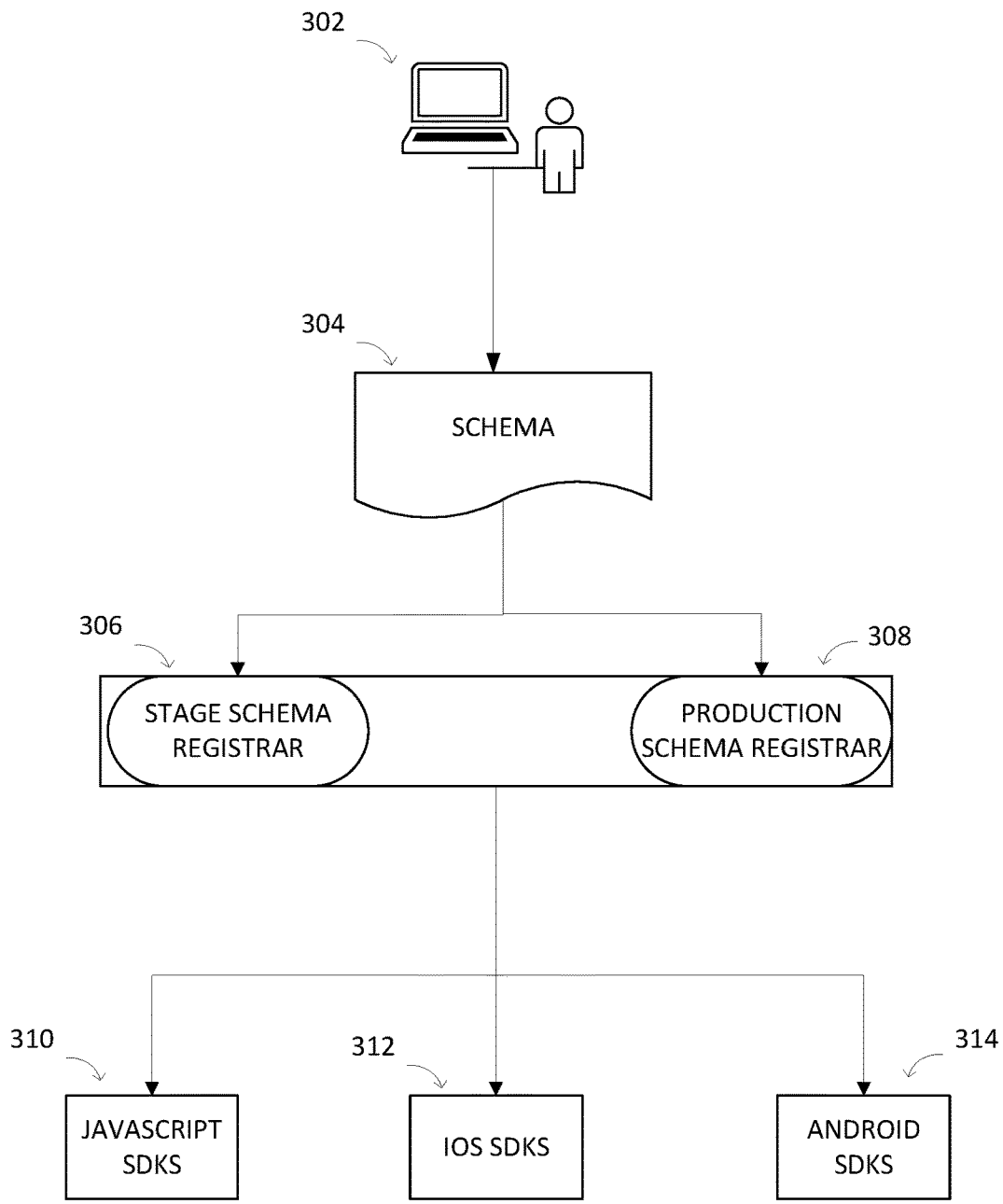
FIG. 3 illustrates an example publication of a schema.

FIG. 3 illustrates an example publication of a schema. When an event is captured at a client application, the event may be tagged with metadata. The event stream data, including the associated tagged metadata, may need to be converted into a format required by the server platform for database storage and/or sharing. Specifically, the server platform may facilitate storage of the event stream data in a database that is structured according to a schema. For example, the database may be a table comprising columns and rows. The columns may correspond to a plurality of data fields within a metadata record, which may be defined by the schema. For example, the schema may indicate a position or identity of each data field in the metadata record. The rows may correspond to metadata captured for an event. Accordingly, the cells may represent a value generated for a corresponding data field within the metadata captured for an event.

As illustrated in diagram 300, an administrator 302 (e.g., a developer) may define a schema 304 and select to publish the schema 304 as defined. The schema 304 may be registered with a stage schema registrar 306 and a production schema registrar 308. The schema 304 may then be published to SDKs that are used to create and maintain the client application. For example, the schema 304 may be published to JavaScript SDKs 310 that create and maintain thin versions of the client application (e.g., web applications accessed via a web browser). The schema 304 may also be published to IOS SDKs 312 and Android SDKs 314 that create and maintain thick versions of the client application (e.g., locally installed versions of the application) that are executing on devices operating on IOS or Android platforms, respectively.

In some embodiments, the publication of the schema 304 to the SDKs enables the client application to perform the data serialization process by applying the schema to the tagged metadata of the captured event. As a result, the data is already in the format required for storage when received by the server platform. However, data serialization requires a significant amount of processing to be performed, which adds latency to the client application and the device executing the client application.

In other embodiments, where the server platform is performing the data serialization, the publication of the schema 304 may be for purposes of collecting metadata for standardization among a variety of consumer devices operating on different platforms, for example.

Figure 4:
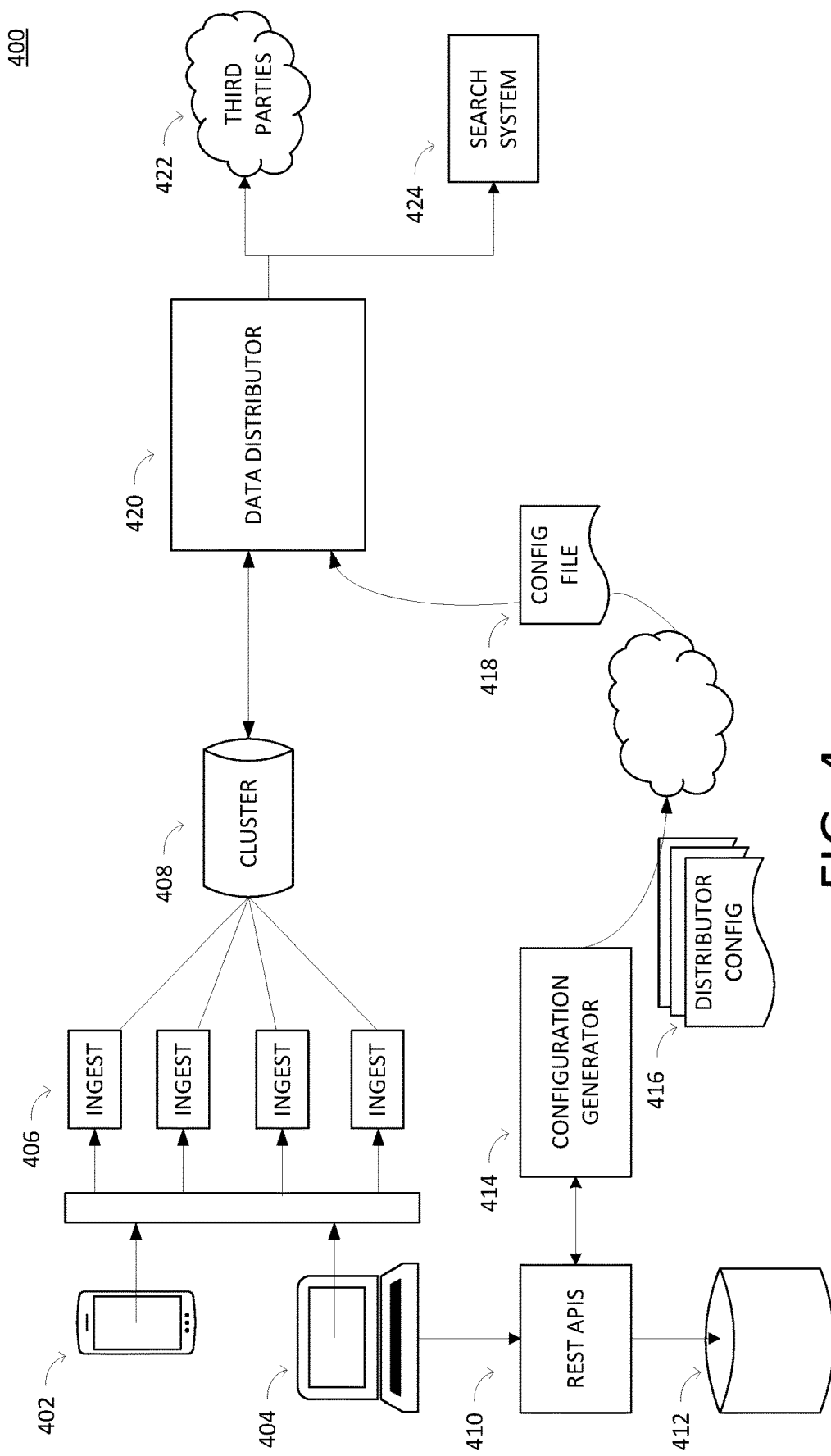
FIG. 4 illustrates an example data flow for real-time collection and distribution of event stream data to third parties.

FIG. 4 illustrates an example data flow for real-time collection and distribution of event stream data to third parties. As shown in a diagram 400, events may be captured at a client application executed on a consumer device, such as a smartphone 402 or a laptop computer 404. For example, the smartphone 402 may be executing a thick version of the client application (e.g., a locally installed mobile application), whereas the laptop computer 404 may be executing a thin version of the client application (e.g., a web application accessed via a web browser). When the events are captured at the client application, each event may be tagged with metadata. The event data and associated tagged metadata for each event may be individually ingested 406 to a server platform utilizing a streaming data service. The service, among other things, permits the client application to publish streams of data to topics. For example, the streaming data service may receive and process the event stream data published from the client application as a message that is transferred onto topics and stored within a cluster 408. A data distribution flow may then be triggered to determine which third parties 422 to send the event stream data to, and if so, which portions of the event stream data to send and a format in which to send the event stream data. The data distribution flow may be facilitated by a data distributor 420 associated with the server platform.

The data distributor 420 may receive the event stream data from the cluster 408 and transform the event stream data for distribution to one or more of the third parties 422. The third parties 422 may provide a request to receive data, the request specifying one or more types of data including data attributes (e.g., data fields of interest) for each type and a definition of data format (e.g., JSON, XML, or plain text file), which are converted into rules and templates. For example, a third party may request data associated with a purchase event and specify that the product purchased, day/time of purchase, location of user who purchased, etc. are requested attributes. The rules and templates may be applied by one or more components of the data distributor 420 to transform the event stream data for distribution, which is described in detail in conjunction with FIG. 5. As a result, the data distributor 420 provides only the portions of the event stream data requested by a third party in a data format specified by the third party.

Before transmitting the transformed data to a third party, a copy may be stored internally within the server platform. The saved copy may enable creation of a distribution log indicating which third party received data and what data they received. In light of growing concerns about data privacy, this feature may allow compliance with required laws and/or implemented policies. In addition to transmitting the transformed data to the third party, the data distributor 420 may provide the transformed data to a search system 424 to enable the data stored internally to be effectively searched for.

The data distributor 420 may be configured based on a configuration file 418 of a distributor configuration 416 generated by a configuration generator 414. The configuration generator 414 may generate the distributor configuration 416 based on information received from consumer devices, such as the laptop computer 404, through rest APIs 410, for desired third party distribution endpoints and associated third party schemas. Additionally, the information received may be stored in a database 412.

Figure 5:
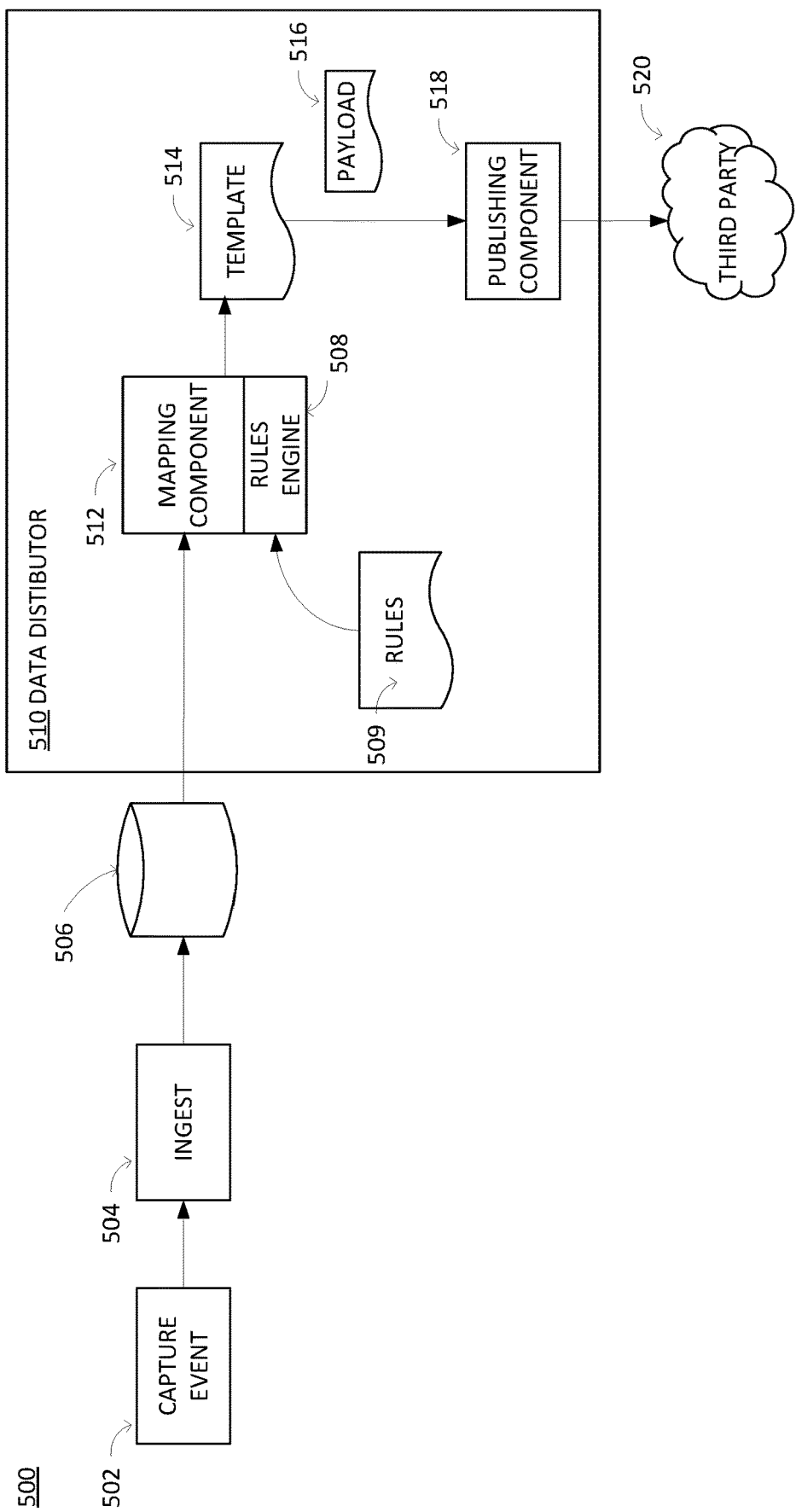
FIG. 5 illustrates an example process for distributing event stream data to a third party.

FIG. 5 illustrates an example process for distributing event stream data to a third party. As shown in a diagram 500, an event may be captured 502 at a client application. Data associated with the event (e.g., event stream data) may be ingested 504 by a server platform utilizing a streaming data service. The service, among other things, permits the client application to publish streams of data to topics. For example, the streaming data service may receive and process the event stream data published from the client application as a message that is transferred onto topics within a cluster 506 for storage.

A data distribution flow may then be triggered to determine whether to send the event stream data to a third party 520, and if so, which portions of the event stream data to send and a format in which to send the event stream data. The data distribution flow may be facilitated by a data distributor 510 associated with the server platform. The data distributor 510 comprises several components including a rule engine 508, a mapping component 512, and a publishing component 518, among others.

The rule engine 508 transforms the event stream data (e.g., by changing or adding new values to the event stream data) using one or more rules 509. For example, the rule engine may process the event stream data using one or more rules to determine a type of the event reflected in the event stream data. In order to determine that the event is a particular type of event, a set of conditions must be met. If the set of conditions are met, then an action may be performed by the rule engine 508 to transform the event stream data. For example, the rule engine 508 may add a value to a field to indicate the type of the event that occurred (e.g., a page load, a click, a call by the page to another service, etc.).

Based on the determined event type, the rule engine may determine which third parties, such as third party 520, to send the data to (e.g., based on whether a third party has indicated they are interested in obtaining data associated with that event type). Additionally, one or more of the rules 509 may be used to determine which endpoint of the third parties to send the event stream data to. For example, a third party may have multiple endpoints to which the data may be transmitted, where particular types of events have to been sent to specific endpoints. Accordingly, a rule may set a uniform resource locator (URL) to the correct endpoint for the specific event type with which the event data is associated.

A template engine associated with the mapping component 512 may select a template 514 to be applied to the event stream data in preparation for publishing the event stream data to the third party 520. The template engine may include a list of templates available for distribution, including a default template or set templates. The set templates may be specific to a type of the event, and define all attributes of the event stream data to be sent to the third party 520 for the respective event type. The templates may be provided by the third party 520 or generated based on information provided by the third party 520 regarding a type of data they desire for each event type and the format in which the data it to be provided, such as JSON, XML, or plain text file, among other examples. The template 514 may reference a separate file that identifies structure of the template or the structure of the template 514 can be defined inline. Additionally, some sections in the template 514 may define syntax, where a placeholder may be used for a value in the template 514 that will be replaced with values once the rules 509 have run in the rule engine 508. In some embodiments, the template 514 may import a functionality from another template, where the other template may be nested. For example, the other template whose functionality is being imported by the template is importing the functionality from a further template.

When ingested by the streaming data service, the event stream data may be formatted as a JSON object. Dynamic SQL query language (DSQL) may convert the event stream data to a database, and provide a way to write SQL against the JSON object such that the event stream data may be queried within the database. Specifically, the database may be queried for each attribute of the event stream data listed within the template 514 in order to collect values for all data needed to send to the third party 520. A DSQL template may be implemented to format the results from the query. For example, if within the event stream data a set of conditions is met, the result are formatted using the DSQL template and various elements of the results are separated using a delimiter so that the third party 520 may make sense of the data upon receipt. The results formatted in accordance with the template 514 may be inserted as a payload 516 of a message and provided to the publishing component 518 for distribution to the third party 520.

Together the rule engine, the template engine, and the DSQL define a value unit. Microservices hosted by the server platform may provide filters to allow the user to share the value unit that they have created and use value units created by others in the server platform 106. As a result, one or more of the rules 509 can reference a value unit created by others in a rules file. In some embodiments, an application programming interface (API) of the data distributor may provide a user interface through which users are able to define, share, and use value units.

To provide an example scenario, the third party 520 may request to receive data associated with purchase events at the client application. Within the request, the third party 520 may provide a list of data attributes desired for the purchase event and a format in which to send the data. Once an event is captured 502 at the client application and the associated event stream data is ingested 504, stored in the cluster 506, and received by the rule engine 508, the rule engine 508 may process the event stream data using one or more rules to determine a type of the event. In order to determine that the event is a particular type of event, a set of conditions must be met. For example, as illustrated in CODE 1, to determine that the event is a purchase event, the set of conditions required may include a field "checkout. purchase" has a value of true, a field "appState.pageName" has a value of order confirmation, and a field checkout.cartView has a value of false. If the set of conditions are met, then an action may be performed by the rule engine 508 to transform a value of a field based on the set of other fields' conditions being met. For example, if the set of conditions are met to determine the event is a purchase event, the rule engine 508 may modify a field "guest.eventType" with a value of "ecommercepurchase."

CODE 1:

```
{
  "field": "guest.eventType",
  ...
  "conditions": [
    {
      "condEnum":"MATCH",
      "logicalOperator":"AND",
      "field":"checkout.purchase",
      "pattern":"true"
    },
    {
      "condEnum":"CONTAINS",
      "logicalOperator":"AND",
      "field":"appState.pageName",
      "pattern":"order confirmation"
    },
    {
      "condEnum":"MATCH",
      "logicalOperator":"AND",
      "field":"checkpit.cartView"
      "pattern":"false"
    },
  ],
  "action":{
    "actionEnum":"REPLACE"
    "pattern": "(^)(.*)"
    "value":"ecommerce_purchase"
  }
}
```

Once the rule engine 508 determines the event is a purchase event and modifies the value of the field to "ecommerce_purchase", the type of event as a purchase event may be validated as true. If validated as true, the template engine may perform an action to set the template 514 as an ecommercePurchase template. The ecommercePurchase template may be one of the set templates within the template engine that corresponds to an event type of purchase event. As shown in CODE 2, the template 514 may reference a separate file (ffl:uri) that identifies structure of the template. Additionally, some sections in the template 514 contain a placeholder "$" that may be used for a value in the template 514 that will be replaced with values once the rules 509 have run in the rule engine 508.

CODE 2:

```
{
  "default": "${ffl:uri default.txt}",
  "ecommercePurchase": ""${ffl:uri ecommercePurchase t.txt}",
  ...
}
```

The DSQL may convert the event stream data ingested by the streaming data service to a database, and write SQL against the event stream data such that it may be queried for within the database. A syntax (e.g., ffl dsql as shown in CODE 3) may signal that the template 514 contains a list of attributes that need to be queried for in association with the event. The list of attributes may correspond to the data attributes defined in the request received from the third party 320. Results of the query may be formatted using the DSQL template and various elements of the results may be separated using a delimiter so that the third party 520 may make sense of the data upon receipt. The results formatted in accordance with the template 514 may be inserted as the payload 516 of a message and provided to the publishing component 518 for distribution to the third party 520.

CODE 3:

```
...
[JSONPAYLOAD]
{
  "app_event_data": {
    "orderid": "${checkout.orderid}",
    "line_items": [${ffl:dsql productsList}]
  {
```

Figure 6A:
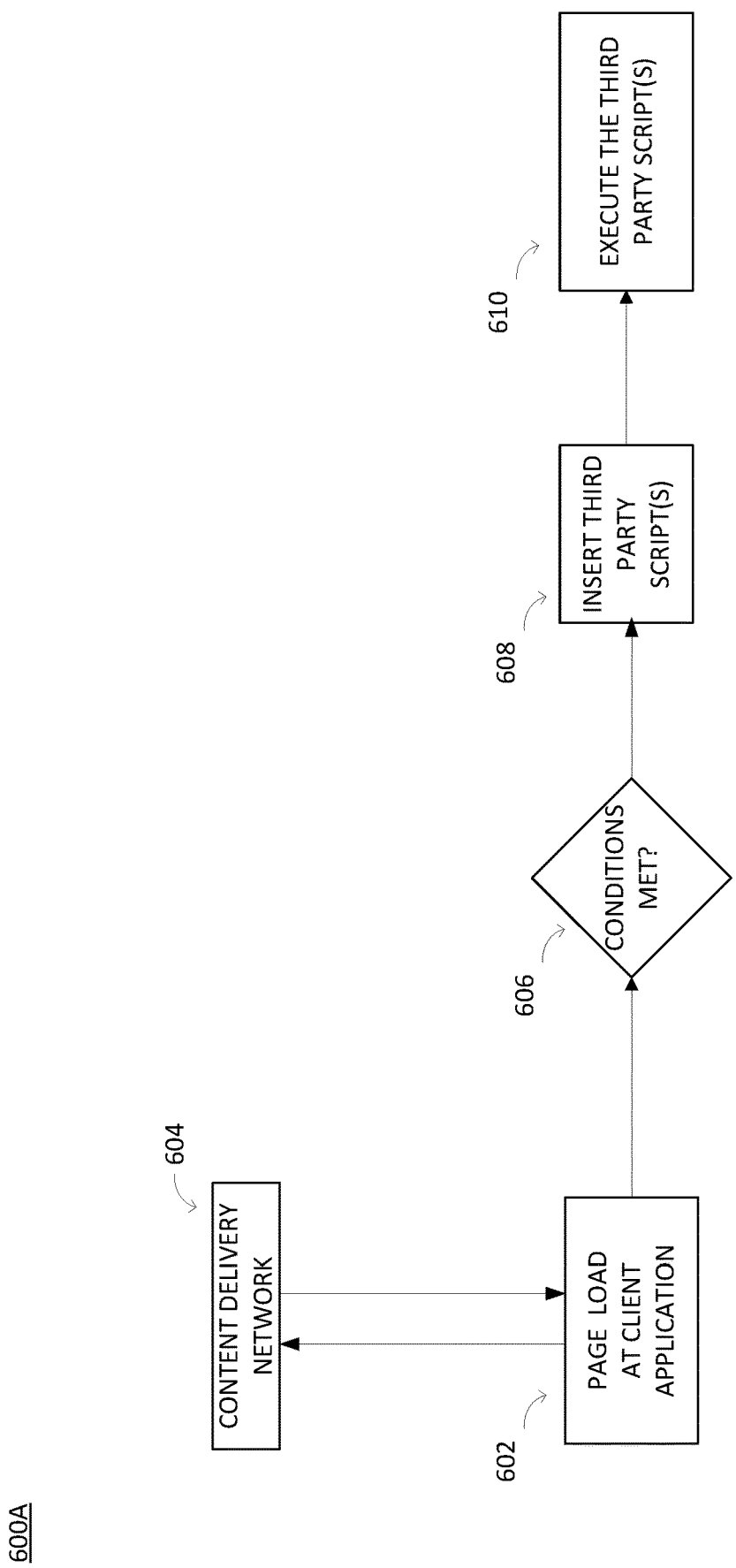
FIGS. 6A and 6B illustrate an example process for integrating third party scripts into a client application at run time.
Figure 6B:
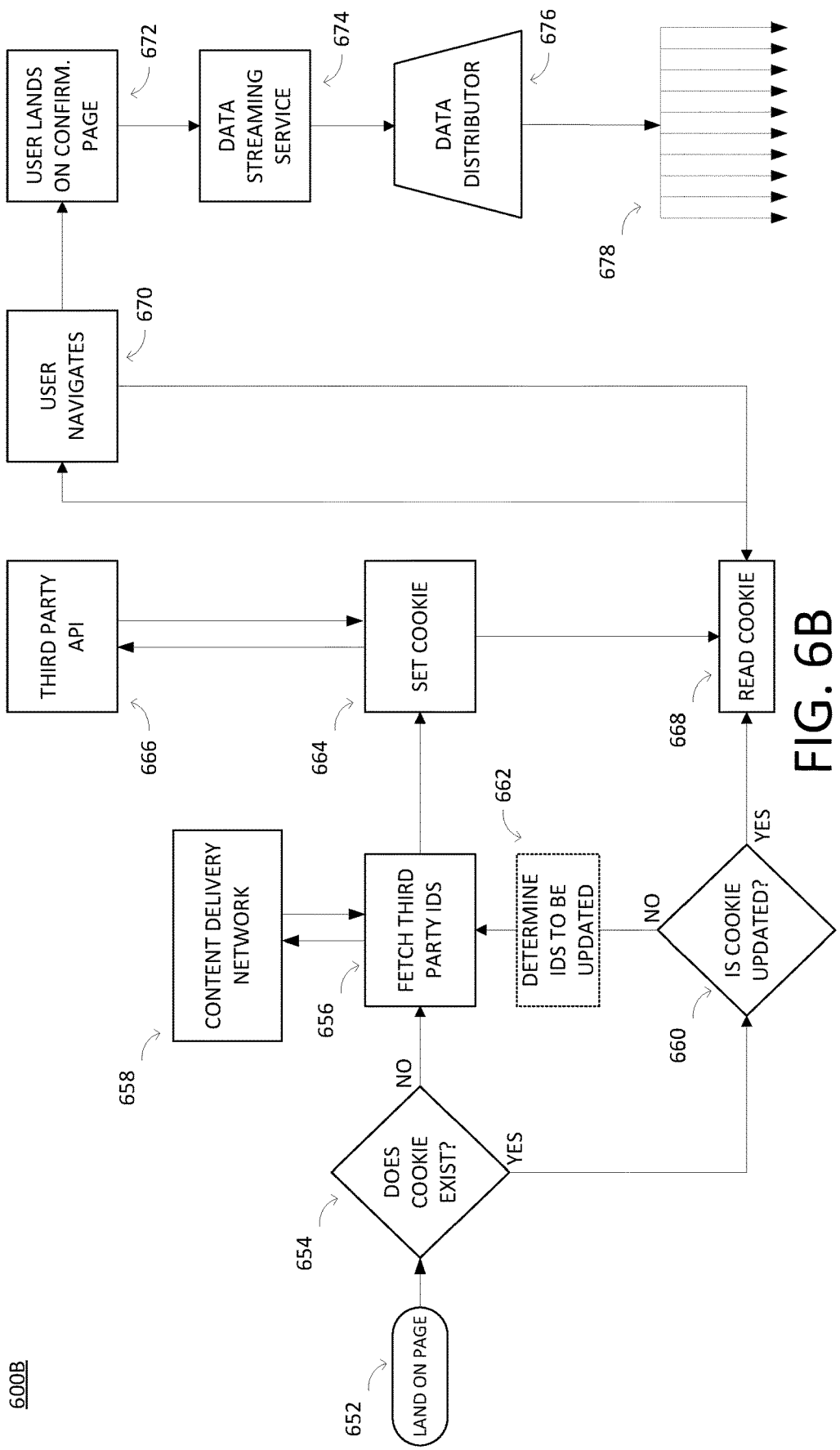

FIGS. 6A and 6B illustrate example processes for integrating third party scripts into a client application at run time. The example systems and methods for real-time data collection and third party distribution discussed in FIGS. 1-5 eliminate the need for third party script insertion into the client application to allow a third party to obtain data. However, if third party script is optionally integrated into a client application, diagrams 600A and 600B illustrate an example integration process that enables insertion of third party script at run time.

As previously discussed, to obtain user interaction data from a client application, a third party would traditionally provide a snippet of code (e.g., a pixel) to be built into the client application. When a user lands on a page of the client application, the snippet of code would externally call an endpoint of the third party to request additional code to be executed on the page of the client application in order to collect user interaction data that is sent back to the third party. As the amount of third party code built into the client application increases, the number of external calls that have to be made increases, which adds latency. Therefore, it is desirable to avoid having to build the third party scripts into the client application. One option to avoid is to subscribe to a tag management service that stores third party scripts and provides the third party scripts for insertion to the client application at run-time. However, these services can be costly.

Embodiments described herein, provide an integration process that enables insertion of third party scripts at run time. A distributed version control system, such as Git, may be leveraged to control access to who can write and make changes to files and history features to remain informed of what is changed and who changed it. Jobs may be built to automatically execute, update and send information to the client application to insert third party scripts currently living on the client application at run time so they are not built into the site. For example, to insert third party script at run time (e.g., at time of a page load), a complete list of third party scripts may be received, one or more third party scripts may be selected from the list for insertion based on which page has been loaded and whether conditions have been met, and selected third party scripts may be inserted and executed immediately.

As illustrated in a diagram 600A of FIG. 6A, when a page of a client application loads at operation 602, some script executes in a header of the page at run time to determine a number of scripts already inserted on the page. In response to a request from the client application, a content delivery network (CDN) 604 securely storing third party scripts may provide available third party scripts. There may be a check of a URL to determine which page has been loaded and whether conditions have been met at decision 606, where the conditions may be page specific. If the conditions have been met, one or more of the third party scripts may be inserted into the header at operation 608. For example, script A and script B may be available third party scripts. If script A only loads on a home page, whereas script B fires on packet data protocol (pdp) then there would be a check of the URL to determine whether or not the loaded page is a home page or on a pdp. If the loaded page is a home page, script A may be inserted. If the loaded page is on a pdp, script B may be inserted. Script itself is an anonymous function. As a result, the script is immediately executed as soon as it is inserted at operation 610.

Diagram 600B of FIG. 6B provides a more detailed example of how the third party script is inserted at run time. At start 652, the process may begin when a user lands on a page of the client application (e.g., when the user navigates to a web application via a web browser or opens a locally installed application). At decision 654, there is a check to see if a cookie for third party IDs exists. If the cookie does not exist, then all the third party IDs are fetched at operation 656 from a content delivery network (CDN) 658. A list of third party IDs may be contained in a JSON file, stored in CDN 658.

If the cookie does exist, then there is another check to see if the values of the cookie are all synced (i.e., the IDs have updated values) at operation 660. If the values are not all synched, all of the third party IDs may be re-fetched at operation 656 or an optional determination of which ID(s) need to be updated may be made at operation 662, and only those ID(s) determined may be re-fetched at operation 656. Once all third party IDs are fetched/re-fetched from the CDN 658 at operation 656, the cookie is set at operation 664 by sending a request to a third party URL via a third party API 666 to retrieve data, including an ID name and value, to be inserted into the cookie. Once the cookie is set at operation 664 or if the cookie values were all synched (i.e., the IDs had updated values), the cookie may be read at operation 668.

As a user navigates around the client application 670, the client application will reference the cookie. When the user lands on an order confirmation page of the application 672, the data is published to a streaming data service 674. The streaming data service 674 may receive and process the data published from the client application as a message that is transferred onto topics and stored within a cluster. The data may then be sent from the cluster to a data distributor 676 that transforms the data to meet requirements for each of the third parties 678 to which the data will be sent.

The examples provided in FIGS. 1 through 6B are illustrated with specific systems, platforms, services, applications, devices, and processes. Embodiments are not limited to environments according to these examples. Real-time collection and distribution of event stream data may be implemented in environments employing fewer or additional systems, platforms, services, applications, devices, and processes. Furthermore, the example systems, platforms, services, applications, devices, and processes shown in FIGS. 1 through 6B may be implemented in a similar manner with other values using the principles described herein.

Figure 7:
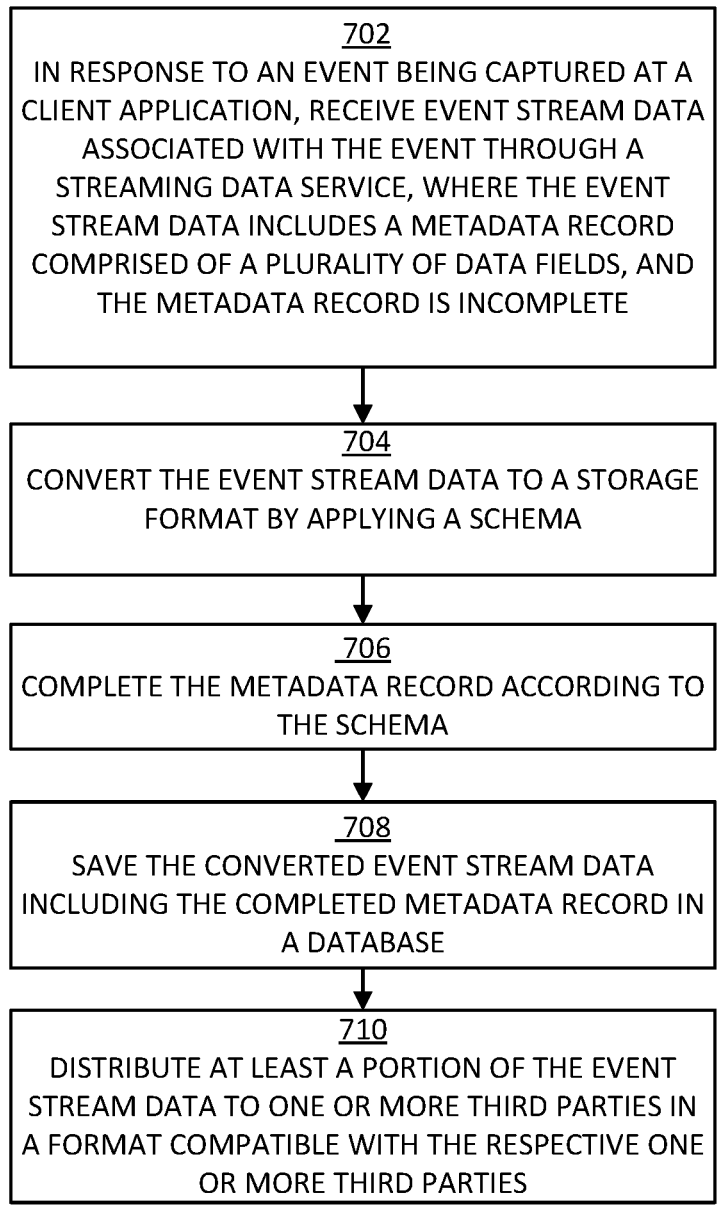
FIG. 7 illustrates an example method of real-time collection and distribution of event stream data.

FIG. 7 illustrates an example method for real-time collection and distribution of event stream data. At operation 702, a server platform may receive event stream data from a client application through a streaming data service. The event stream data may be associated with an event captured at the client application. The client application may be a web application accessed through a web browser (e.g., a website) or a locally installed application, such as a mobile application. The event may include a user interaction, such as a page load or a click, or events unrelated to the user, such as a return of information by a service, a recommendation call, or a display of an advertisement. When the event is captured at the client application, the event is tagged with metadata. The metadata may be in the form of a record comprising a plurality of fields. When the event stream data, including the metadata record is received at the server platform, the metadata record may be incomplete. For example, one or more of the plurality of data fields may be marked as null (i.e., contain no value).

At operation 704, the server platform converts the event stream data to a storage format by applying a schema. The schema can be based on a position of each data field of the plurality of data fields in the metadata record, the position defining information contained within each data field. For example, the storage format is a database table comprising one or more rows and columns that intersect to form a plurality of cells. The rows could represent events and the columns could represent each data field of the plurality of data fields within the metadata record. Accordingly, to convert the event stream data, the event stream data is placed in a row, and each cell in that row is populated with a value for the corresponding data field within the metadata record. However, because the metadata record may be incomplete relative to the full event stream that might define all possible events that can be described using a schema, one or more of the cells within the row may be empty.

At operation 706, the server platform may complete the metadata record according to the schema. For example, default values may be placed within the empty cells. The converted event stream data including the completed metadata record may then be saved in a database of the server platform at operation 708.

At operation 710, at least a portion of the event stream data may be distributed to one or more third parties in a format that is compatible with the respective one or more third parties. For example, a request for one or more types of event stream data may be received from each third party. The request may include specific data attributes desired for each of the one or more types (e.g., data fields of interest for each event type), and a format for distributing the event stream data. One or more rules and one or more templates may be generated for each third party based on the received requests. Applying the one or more rules for a third party, the server platform may determine to distribute one or more portions of the event stream data to the third party. For example, the third party's request may have indicated they wanted purchase event data, and the event stream data is associated with a purchase event. The one or more portions of event stream data provided may correspond to the data attributes specified for the type of the event stream data. Continuing the previous example, the attributes specified may include a product that was purchased, a day/time the product was purchased, a geographical location of the purchaser, etc. The one or more portions of the event stream data may then be converted to the format requested by applying a respective template for the third party. The formatted one or more portions of the event stream data may be published to the third party.

The operations 702 to 710 are included for illustration purposes. Real-time collection and distribution of event stream data may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 8:
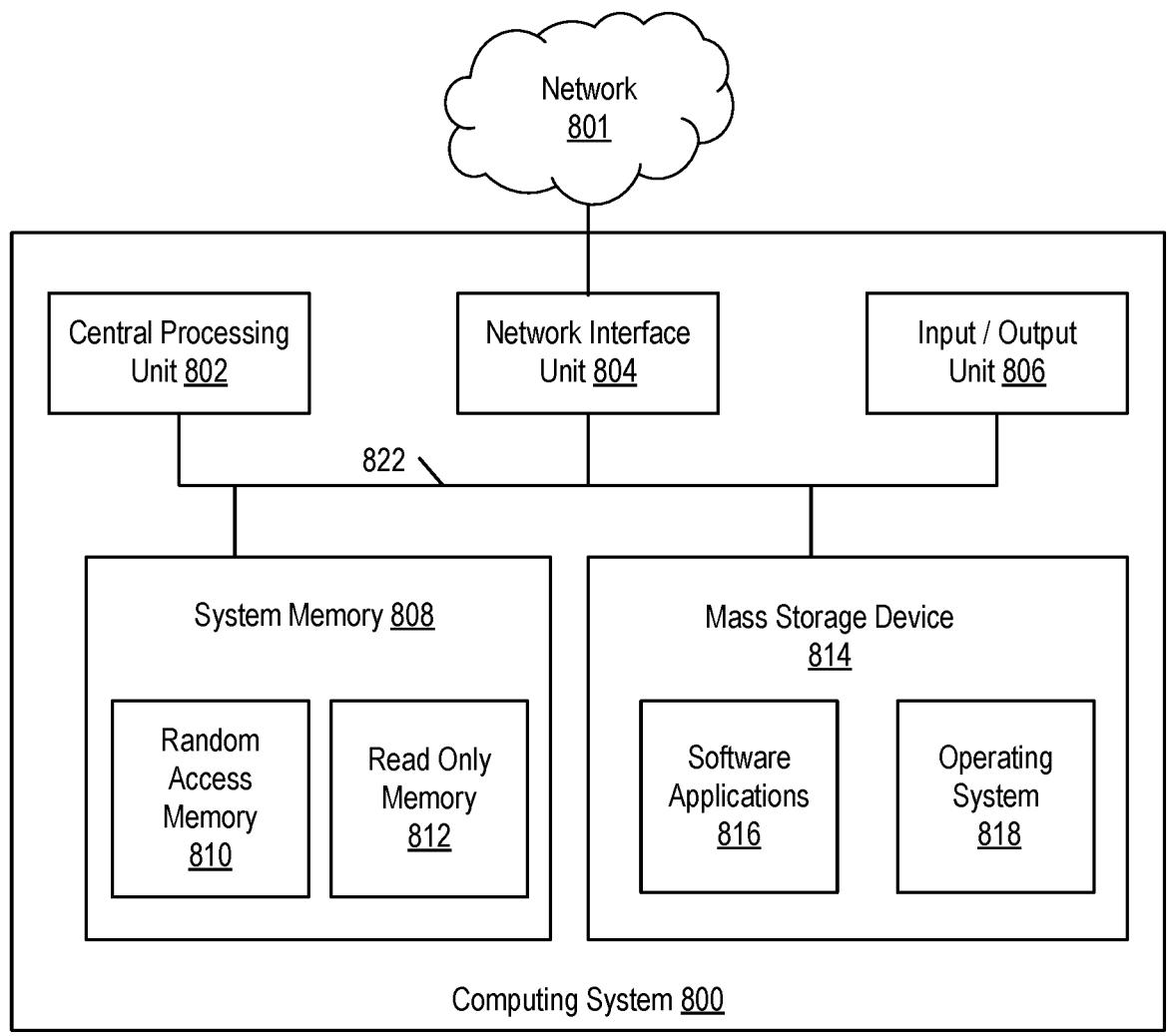
FIG. 8 illustrates an example block diagram of a computing system.

FIG. 8 illustrates an example block diagram of a computing system 800. One or more aspects of the computing system 800 can be used to implement the server platform 106 and one or more components of the server platform 106 including the ingest component 108, the stream processor component 110 and the data distributor component 120, among other devices or components of the server platform 106.

In the embodiment shown, the computing system 800 includes at least one CPU (Central Processing Unit) 802, a system memory 808, and a system bus 822 that couples the system memory 808 to the CPU 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814. The mass storage device 814 is able to store software instructions and data. In many examples, the one or more processors 107 operable to execute the server platform 106 and/or components thereof are each implemented as the at least one CPU 802.

The mass storage device 814 is connected to the CPU 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through a network 801. The computing system 800 may connect to the network 801 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions, that when executed by the CPU 802, cause one or more of the systems, devices, or components described herein to provide functionality described herein. For example, the mass storage device 814 and/or the RAM 810 can store software instructions that, when executed by the CPU 802, cause the computing system 800 to receive and execute managing network access control and build system processes.

According to embodiments, methods for collecting event stream data in real-time are disclosed. An example method includes receiving event stream data associated with an event through a streaming data service in response to the event being captured at a client application. The event stream data may include a metadata record comprised of a plurality of data fields, and the metadata record may be incomplete. The example method may further include converting the event stream data to a storage format by applying a schema, where the schema is based on a position of each data field of the plurality of data fields in the metadata record, the position defining information contained within each data field, completing the metadata record according to the schema, and saving the converted event stream data including the completed metadata record in a database.

In some embodiments, at least a portion of the event stream data may be distributed to one or more third parties. For example, a request for event stream data may be received from each of the third parties. The request may include one or more types of event stream data, specified data attributes for each of the one or more types, and a format in which to distribute the event stream data. One or more rules and one or more templates may be generated for each third party based on the received requests. One or more portions of the event stream data may be distributed to a third party based on the respective one or more rules for the third party, where the portions may correspond to the data attributes specified for the type of the event stream data. The one or more portions of the event stream data may be converted into the format based on the respective one or more templates for the third party. The formatted one or more portions of the event stream data may be published to the third party.

In other embodiments, the storage format may be a database table comprising one or more rows representing events and one or more columns representing each data field of the plurality of data fields within the metadata record that intersect to form a plurality of cells. To convert the event stream data to the storage format by applying the schema, the event stream data may be placed in a row, and each cell in the row may be populated with a value for the corresponding data field within the metadata record, where the metadata record being incomplete may cause one or more of the cells in the row to be empty. The empty cells in the row may be populated with a default value to complete the metadata record according to the schema.

In further embodiments, the schema may be capable of being evolved in response to detecting a new feature or a new functionality associated with the client application. A user interface may be provided to facilitate automatic evolution of the schema. Upon converting the event stream data to the storage format, one or more stream processes may be written against the event stream data. Personalization may be at least one of the stream processes written against the event stream data.

In yet further embodiments, third party scripts may be integrated into the client application at run time. Integrating the third party scripts into the client application at run time may include detecting a page load at the client application, receiving a list of scripts, the scripts associated with third parties requesting the event stream data from the client application, selecting one or more of the scripts from the list based on a type of the page and whether one or more conditions specific to the page are met, inserting the selected scripts to the client application, and executing the inserted scripts to collect the event stream data.

According to some examples, server platforms for collecting event stream data in real-time are disclosed. An example server platform includes a communication interface receiving data from a client application, a processor communicatively connected to the communication interface, and a memory communicatively connected to the processor and communication interface. The memory stores instructions, which when executed by the processor, cause the server platform to receive event stream data associated with the event through a streaming data service in response to an event being captured at the client application. The event stream data may include a metadata record comprised of a plurality of data fields, and the metadata record may be incomplete. The event stream data may be converted to a storage format by applying a schema, where the schema may be based on a position of each data field of the plurality of data fields in the metadata record, the position defining information contained within each data field. The metadata record may be completed according to the schema, and the converted event stream data including the completed metadata record may be saved in a database.

In other examples, the streaming data service may enable the client application to publish the event stream data to a topic, and the streaming data service may receive and process the event stream data published by the client application as a message that is transferred onto the topic within a storage cluster of the streaming data service. The storage format may be a database table comprising one or more rows and one or more columns intersecting to form a plurality of cells. To convert the event stream data to the storage format by applying the schema, the event stream data may be placed in a row and each column represents a data field of the plurality of data fields within the metadata record such that a cell may be populated with a value for the corresponding data field within the metadata record.

In further examples, the schema may be a web analytics schema to be applied to event stream data. Another type of data may be captured by the client application, received through the streaming data service, and converted to a storage format by applying a different schema based on the type of the data. The different schema may be one or more of a product impressions schema, an ad impressions schema, a run analytics schema, and an in-line search feedback schema. The event may be one or more of a user interaction, a return of information from a service, a recommendation call, and a display of an advertisement.

According to some embodiments, a non-transitory computer-readable medium with instructions stored thereon for real-time collection and distribution of event stream data is disclosed. Examples instructions may include receiving event stream data associated with an event through a streaming data service in response to the event being captured at a client application. The event stream data may include a metadata record comprised of a plurality of data fields, and the metadata record may be incomplete. The example instructions may also include converting the event stream data to a storage format by applying a schema. The schema may be based on a position of each data field of the plurality of data fields in the metadata record, where the position defines information contained within each data field. The example instructions may further include completing the metadata record according to the schema, saving the converted event stream data including the completed metadata record in a database, and distributing at least a portion of the event stream data to one or more third parties.

In other embodiments, a copy of the at least portion of the event stream data distributed to the one or more third parties may be saved. A distribution log may be created based on the copy.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

The invention claimed is:

1. A method for collecting event stream data in real-time, the method comprising:
   in response to an event of a particular event type being captured and tagged with metadata at a client application, receiving, at a server platform, event stream data associated with the event through a streaming data service, wherein:
      the event of the particular event type is defined by a plurality of attributes,
      the event stream data includes a metadata record comprised of a plurality of data fields representing the plurality of attributes, a portion of the plurality of data fields correspond to the tagged metadata, and
the metadata record is incomplete;
converting the event stream data to a storage format by applying a schema, wherein:
the schema is based on a position of each data field of the plurality of data fields in the metadata record, the position defining information contained within each data field corresponding to one of the plurality of attributes, and
one or more of the plurality of data fields is unpopulated in the storage format based on the metadata record being incomplete;
completing the metadata record according to the schema to populate the one or more of the unpopulated data fields in the storage format;
automatically evolving the schema in response to detecting a new feature or a new functionality associated with the client application;
updating the completed metadata record to reflect the evolved schema; and
saving the converted event stream data including the completed metadata record reflecting the evolved schema in a database associated with the server platform.

2. The method of claim 1, further comprising:
distributing at least a portion of the event stream data to one or more third parties.

3. The method of claim 2, wherein distributing at least the portion of the event stream data to the one or more third parties comprises:
receiving, from each of the one or more third parties, a request for event stream data, the request including one or more event types for which associated event stream data is requested, specified attributes for each of the one or more event types, and a format in which to distribute the event stream data; and
generating one or more rules and one or more templates for each third party based on the received requests.

4. The method of claim 3, further comprising:
determining to distribute one or more portions of the event stream data to a third party based on the respective one or more rules for the third party, wherein the one or more portions correspond to one or more attributes, from the plurality of attributes, specified for the particular event type of the event;
converting the one or more portions of the event stream data into the format based on the respective one or more templates for the third party; and
publishing the formatted one or more portions of the event stream data to the third party.

5. The method of claim 1, wherein the storage format is a database table comprising one or more rows representing events and one or more columns representing each data field of the plurality of data fields within the metadata record that intersect to form a plurality of cells, and converting the event stream data to the storage format by applying the schema further comprises:
placing the event stream data in a row; and
populating each cell in the row with a value for the corresponding data field within the metadata record, wherein the metadata record being incomplete causes one or more cells in the row to be empty.

6. The method of claim 5, wherein completing the metadata record according to the schema comprises:
populating the one or more of the empty cells in the row with a default value.

7. The method of claim 1, further comprising:
providing a user interface to facilitate automatic evolution of the schema.

8. The method of claim 1, further comprising:
upon converting the event stream data to the storage format, writing one or more stream processes against the event stream data.

9. The method of claim 8, wherein personalization is at least one of the one or more stream processes written against the event stream data.

10. The method of claim 1, further comprising:
integrating third party scripts into the client application at run time.

11. The method of claim 10, wherein integrating the third party scripts into the client application at run time comprises:
detecting a page load at the client application;
receiving a list of scripts, the scripts associated with third parties requesting the event stream data from the client application;
selecting one or more of the scripts from the list based on a type of the page and whether one or more conditions specific to the page are met;
inserting the selected scripts to the client application; and
executing the inserted scripts to collect the event stream data.

12. A server platform comprising:
a communication interface receiving data from a client application;
a processor communicatively connected to the communication interface;
a memory communicatively connected to the processor and communication interface, the memory storing instructions, which when executed by the processor, cause the server platform to:
in response to an event of a particular event type being captured and tagged with metadata at the client application, receive, at the server platform, event stream data associated with the event through a streaming data service, wherein:
the event of the particular event type is defined by a plurality of attributes,
the event stream data includes a metadata record comprised of a plurality of data fields representing the plurality of attributes,
a portion of the plurality of data fields correspond to the tagged metadata, and
the metadata record is incomplete;
convert the event stream data to a storage format by applying a schema, wherein:
the schema is based on a position of each data field of the plurality of data fields in the metadata record, the position defining information contained within each data field corresponding to one of the plurality of attributes, and
one or more of the plurality of data fields is unpopulated in the storage format based on the metadata record being incomplete;
complete the metadata record according to the schema to populate the one or more of the unpopulated data fields in the storage format;
automatically evolve the schema in response to a detected new feature or new functionality associated with the client application;
update the completed metadata record to reflect the evolved schema; and save the converted event stream data including the completed metadata record reflecting the evolved schema in a database associated with the server platform.

13. The server platform of claim 12, wherein the streaming data service enables the client application to publish the event stream data to a topic, and the streaming data service may receive and process the event stream data published by the client application as a message that is transferred onto the topic within a storage cluster of the streaming data service.

14. The server platform of claim 12, wherein the storage format is a database table comprising one or more rows and one or more columns intersecting to form a plurality of cells.

15. The server platform of claim 14, wherein to convert the event stream data to the storage format by applying the schema, the event stream data is placed in a row and each column represents a data field of the plurality of data fields within the metadata record such that a cell is populated with a value for the corresponding data field within the metadata record.

16. The server platform of claim 12, wherein the schema is a web analytics schema to be applied to event stream data.

17. The server platform of claim 12, wherein another type of data is captured by the client application, received through the streaming data service, and converted to a storage format by applying a different schema based on the type of the data.

18. The server platform of claim 17, wherein the different schema is one or more of a product impressions schema, an ad impressions schema, a run analytics schema, and an in-line search feedback schema.

19. The server platform of claim 12, wherein the event is one or more of a user interaction, a return of information from a service, a recommendation call, and a display of an advertisement.

20. A non-transitory computer-readable medium with instructions stored thereon for real-time collection and distribution of event stream data, the instructions comprising:
in response to an event of a particular event type being captured and tagged with metadata at a client application, receiving, at a server platform, event stream data associated with the event through a streaming data service, wherein:
the event of the particular event type is defined by a plurality of attributes,
the event stream data includes a metadata record comprised of a plurality of data fields representing the plurality of attributes,
a portion of the plurality of data fields correspond to the tagged metadata, and
the metadata record is incomplete;
converting the event stream data to a storage format by applying a schema, wherein:
the schema is based on a position of each data field of the plurality of data fields in the metadata record, the position defining information contained within each data field corresponding to one of the plurality of attributes, and
one or more of the plurality of data fields is unpopulated in the storage format based on the metadata record being incomplete;
completing the metadata record according to the schema to populate the one or more of the unpopulated data fields in the storage format;
automatically evolving the schema in response to detecting a new feature or a new functionality associated with the client application;
updating the completed metadata record to reflect the evolved schema; and
saving the converted event stream data including the completed metadata record reflecting the evolved schema in a database associated with the server platform; and
distributing at least a portion of the event stream data to one or more third parties.

21. The non-transitory computer-readable medium of claim 20, the instructions further comprising:
saving a copy of the at least portion of the event stream data distributed to the one or more third parties; and
creating a distribution log based on the copy.

* * * * *